United States Patent
Leiter

(10) Patent No.: US 11,745,484 B2
(45) Date of Patent: Sep. 5, 2023

(54) PET SANDWICH LAYER

(71) Applicant: Polymeric Film & Bags, Inc., Naples, FL (US)

(72) Inventor: Fredric Leiter, Naples, FL (US)

(73) Assignee: Polymeric Film & Bags, Inc., Naples, FL (US)

(*) Notice: Subject to any disclaimer, the term of this patent is extended or adjusted under 35 U.S.C. 154(b) by 0 days.

(21) Appl. No.: 17/197,780

(22) Filed: Mar. 10, 2021

(65) Prior Publication Data
US 2022/0111623 A1    Apr. 14, 2022

Related U.S. Application Data

(60) Provisional application No. 63/198,291, filed on Oct. 8, 2020.

(51) Int. Cl.
| | | |
|---|---|---|
| B32B 27/36 | (2006.01) | |
| B32B 9/06 | (2006.01) | |
| (Continued) | | |

(52) U.S. Cl.
CPC ............ B32B 27/36 (2013.01); B32B 7/12 (2013.01); B32B 9/06 (2013.01); B32B 33/00 (2013.01); *B32B 3/266* (2013.01); *B32B 18/00* (2013.01); *B32B 27/10* (2013.01); *B32B 29/00* (2013.01); *B32B 29/06* (2013.01); *B32B 37/12* (2013.01); *B32B 2250/03* (2013.01); *B32B 2255/12* (2013.01); *B32B 2255/20* (2013.01); *B32B 2264/1023* (2020.08); *B32B 2307/412* (2013.01); *B32B 2307/518* (2013.01); *B32B 2307/724* (2013.01); *B32B 2307/7265* (2013.01); *B32B 2307/732* (2013.01); *B32B 2307/75* (2013.01); *B32B 2367/00* (2013.01); *B32B 2439/70* (2013.01); *B65D 65/02* (2013.01); *B65D 65/16* (2013.01);
(Continued)

(58) Field of Classification Search
None
See application file for complete search history.

(56) References Cited

U.S. PATENT DOCUMENTS 4,177,314 A * 12/1979 Steeves .................. B41M 5/508
427/504
4,878,765 A    11/1989 Watkins et al.
(Continued)

FOREIGN PATENT DOCUMENTS

EP    0 812 779 A2 * 12/1997

OTHER PUBLICATIONS

USA/US, Commisioner for Patents; International Search Report; dated May 17, 2021.
(Continued)

*Primary Examiner* — Vivian Chen
(74) *Attorney, Agent, or Firm* — Price Heneveld LLP

(57) ABSTRACT

A food wrap for wrapping ovenable foods includes a polyester layer having a thickness of about 12 μm having a first surface and a second surface opposite the first surface, a barrier layer comprising aluminum oxide covering at least a majority of the first surface of the polyester layer, a paper layer adhered to the barrier via an adhesive, where the paper layer has a grammage of about 35 $g/m^2$, and a coating layer covering at least a majority of the paper layer, where the coating layer covers an ink label.

11 Claims, 2 Drawing Sheets

(51) Int. Cl.
  *B32B 7/12* (2006.01)
  *B32B 33/00* (2006.01)
  *B32B 29/00* (2006.01)
  *B32B 18/00* (2006.01)
  *B65D 81/34* (2006.01)
  *B32B 3/26* (2006.01)
  *B32B 27/10* (2006.01)
  *B65D 65/02* (2006.01)
  *B32B 37/12* (2006.01)
  *B32B 29/06* (2006.01)
  *H05B 6/80* (2006.01)
  *B65D 65/16* (2006.01)

(52) U.S. Cl.
  CPC ........ *B65D 81/343* (2013.01); *B65D 81/3446* (2013.01); *B65D 81/3461* (2013.01); *H05B 6/80* (2013.01)

(56) References Cited

U.S. PATENT DOCUMENTS

| | | | |
|---|---|---|---|
| 4,883,936 A | 11/1989 | Maynard et al. | |
| 5,085,904 A * | 2/1992 | Deak | B32B 37/12 427/571 |
| 5,164,562 A * | 11/1992 | Huffman | B65D 81/3453 219/730 |
| 5,231,268 A * | 7/1993 | Hall | B65D 81/3446 219/730 |
| 5,532,063 A * | 7/1996 | Shindoh | C03C 17/245 106/286.1 |
| 5,725,958 A * | 3/1998 | Matsuda | B32B 15/08 428/446 |
| 5,770,301 A * | 6/1998 | Murai | B32B 27/08 428/213 |
| 5,858,487 A * | 1/1999 | Boehler | B32B 29/002 428/34.3 |
| 5,942,320 A * | 8/1999 | Miyake | C08J 7/048 428/216 |
| 6,501,059 B1 * | 12/2002 | Mast | H05B 6/6408 219/730 |
| 8,642,935 B2 * | 2/2014 | Robison | A47J 36/027 219/730 |
| 2003/0211261 A1 * | 11/2003 | Phillips | C23C 14/083 428/35.7 |
| 2004/0137202 A1 | 7/2004 | Hamilton et al. | |
| 2004/0238534 A1 * | 12/2004 | Mast | B65D 5/6664 219/730 |
| 2006/0289521 A1 * | 12/2006 | Bohme | B65D 81/3446 219/730 |
| 2007/0194012 A1 * | 8/2007 | Middleton | B65D 5/5455 219/730 |
| 2007/0251942 A1 * | 11/2007 | Cole | B65D 81/3461 219/730 |
| 2007/0251943 A1 * | 11/2007 | Wnek | B65D 81/3446 219/730 |
| 2007/0275130 A1 * | 11/2007 | Cole | B65D 81/3453 426/107 |
| 2008/0078759 A1 | 4/2008 | Wnek et al. | |
| 2009/0050520 A1 * | 2/2009 | Cambay | B65D 81/3453 206/784 |
| 2009/0188914 A1 * | 7/2009 | Harl | B65D 81/264 219/730 |
| 2009/0277899 A1 | 11/2009 | Cole | |
| 2010/0304106 A1 * | 12/2010 | Takano | B05D 1/60 204/192.15 |
| 2011/0233202 A1 * | 9/2011 | Robison | B65D 81/3893 219/730 |
| 2011/0236706 A1 * | 9/2011 | Uebayashi | C08J 7/048 428/483 |
| 2012/0114916 A1 * | 5/2012 | Anderson | D21H 19/84 428/201 |
| 2012/0152941 A1 | 6/2012 | Wnek et al. | |
| 2013/0340673 A1 * | 12/2013 | Godfroid | B65D 65/42 118/47 |
| 2014/0199505 A1 * | 7/2014 | Lorenzetti | B32B 27/327 428/34.2 |
| 2014/0353307 A1 * | 12/2014 | Pinkstone | B65D 5/2033 219/730 |
| 2020/0224304 A1 * | 7/2020 | Kashiwa | C23C 14/081 |
| 2020/0248298 A1 * | 8/2020 | Kashiwa | B32B 15/20 |
| 2022/0297916 A1 * | 9/2022 | Leiter | B32B 27/08 |

OTHER PUBLICATIONS

Ecosyar VE100 Film Specification, Toyobo Co., Ltd., www.toyobo-global.com/seihin/film/package/products/ecosyar.html, created on May 16, 2016, downloaded on Nov. 8, 2022, 2 pages.
EA-N6000-DM-KR Adhesive Safety Data Sheet, Toyochem Specialty Chemical SDN. BHD., May 9, 2017, 11 pages.
Corkote-69KFP-1 Aqueous Coating Technical Data Sheet, Cork Industries Inc., Feb. 16, 2016, 1 page.
Canadian Intellectual Property Office, Office Action for Canada Patent Application No. 3,115,662, dated May 25, 2023, 5 pages.

\* cited by examiner

PET SANDWICH LAYER

CROSS-REFERENCE TO RELATED APPLICATIONS

This application claims priority to U.S. Provisional Patent Application No. 63/198,291, filed Oct. 8, 2020, entitled "PET SANDWICH LAYER," the entire disclosure of which is incorporated herein.

BACKGROUND

The embodiments disclosed herein relate to a wrap for packaging foods, and in particular to a wrap that includes various polymer, paper and metal oxide layers configured to sufficiently wrap and store foods, such as sandwiches, in a point of sale presentation form while allowing for convection, conduction, radiant and microwave heating and providing improved heat retention, wrapping convenience and a transfer barrier to gas and liquid.

BRIEF SUMMARY OF THE INVENTION

One aspect of the embodiments disclosed herein includes a food wrap for wrapping heated foods that includes a polyester film layer having a thickness of about 12 μm having a first surface and a second surface opposite the first surface, a barrier layer comprising aluminum oxide covering at least a majority of the first surface of the polyester layer, a paper layer adhered to the polyester film layer via an adhesive, where the paper layer has a grammage of about 35 g/m$^2$, wherein the coating layer comprises of a food grade varnish.

Another aspect of the embodiments disclosed herein may also or alternatively include an ovenable or heatable food wrap for wrapping food that includes a polymer film layer coated with a metal oxide layer, and a paper layer coupled to the polymer film layer and metal oxide layer.

Yet another aspect of the embodiments disclosed herein may also or alternatively include a wrap configured to be heated that includes a polymer film layer having a first surface, a second surface opposite the first surface, and a thickness between the first and second surfaces of between about 6 μm and about 30 μm, a metal oxide layer covering at least a majority of one of the surfaces of the polyester film layer, and a paper layer adhered to the polymer film layer and having a grammage of within a range of between about 25 g/m$^2$ and about 80 g/m$^2$.

Still yet another aspect of the embodiments disclosed herein may also or alternatively include a method for manufacturing an ovenable or a heatable wrap for wrapping foods including providing a polymer film layer having a thickness of between about 6 μm and about 30 μm, covering at least a majority of a surface of the polymer film layer with a metal oxide layer, providing a paper layer having a grammage of within a range of between about 25 g/m$^2$ and about 80 g/m$^2$, and coupling the paper layer to the polymer film layer.

These and other features, advantages, and objects of the present invention will be further understood and appreciated by those skilled in the art by reference to the following specification, claims, and appended drawings.

DETAILED DESCRIPTION

Figure 1:
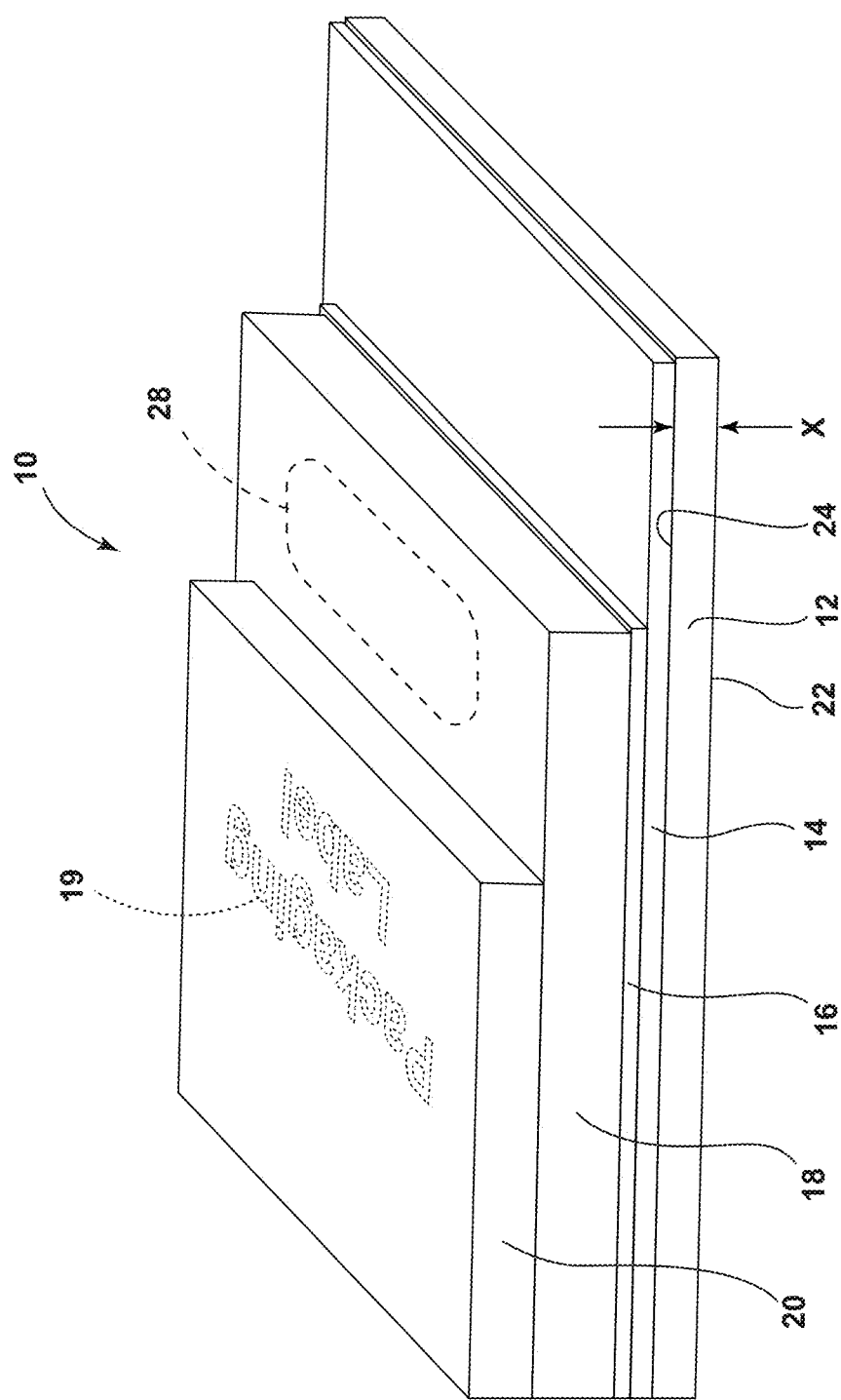
FIG. 1 is a cross-sectional perspective view of an embodiment of a wrap for packaging foods.
Figure 2:
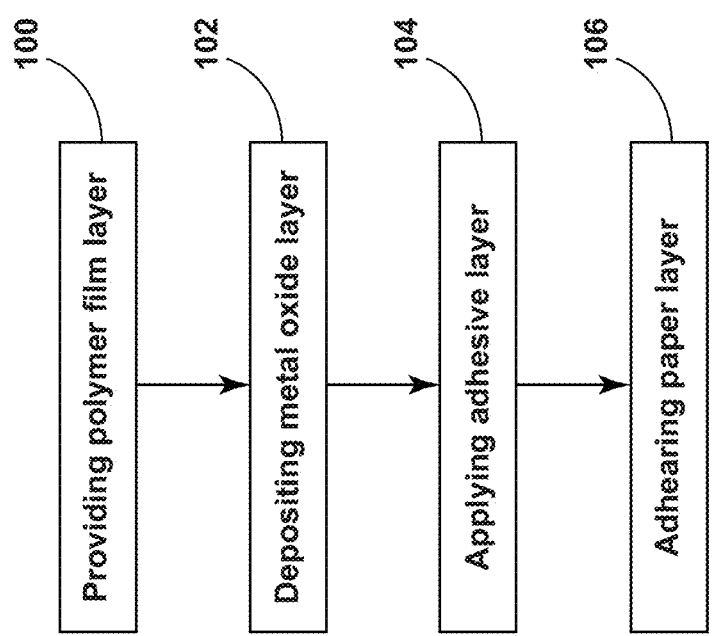
FIG. 2 is a schematic flow chart of a method for manufacturing a wrap for packaging foods.

For purposes of description herein, the terms "upper," "lower," right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a multi-layer food wrap configured to wrap ovenable/heated foods, including foods heated via convection, conduction, radiant and microwave heating methods. In the illustrated example, the wrap 10 may include a polymer film layer 12, a barrier layer 14, an adhesive layer 16, a paper layer 18, and an ink label 19, and a protective overlay 20. The wrap 10 is configured to sufficiently wrap and store foods, such as sandwiches, in a point of sale presentation form while allowing for convection, conduction, radiant and microwave heating. The wrap 10 may also be utilized for other applications where the function of wrapping a given item and subsequently retaining heat within the item is advantageous.

In the illustrated example, the polymer film layer 12 may comprise polyester, and more particularly a polyethylene terephthalate. When comprising polyester, the polymer film layer 12 may include a biaxially oriented polyester to provide the food wrap 10 with an increased tensile strength and a resistance to tensile elongation. Preferably, the polymer film layer 12 is substantially transparent, however the polymer film layer 12 may also be provided in a translucent or opaque form depending upon the requirements of the application. For instance, certain applications may require that the food packaged within the overall food wrap 10 be visible at least through certain or preselected portions of the overall food wrap 10, while other portions of the overall food wrap 10 remain either translucent and/or opaque, as described below. As best illustrated in FIG. 1, the polymer film layer 12 includes a first surface 22 and a second surface 24 opposite the first surface 22, wherein the first and second surfaces 22, 24 cooperate to define a thickness x of the polymer film layer 12 there between. Preferably, the polymer film layer 12 has a thickness x of within the range of between about 6 μm and about 30 μm, more preferably a thickness of within the range of between about 10 μm and about 18 μm, and most preferably of about 12 μm. In another embodiment, the polymer film layer 12 may be replaced with a film layer that in addition or alternatively to the polymer material, comprises nylon. When comprising nylon, the film layer may include nylon 6 or nylon 6,6, and may comprise a biaxially oriented nylon.

The barrier layer 14 may comprise a metal oxide, and preferably comprises aluminum oxide, where the barrier layer 14 is configured as a thermal, gas and/or moisture barrier. Alternatively, silicon oxide may also be utilized with or as a replacement to the metal oxide depending on the requirements of the application. The metal oxide, and in particular the aluminum oxide, provides an improved thermal, gas and moisture barrier when combined with the polymer film layer 12, and in particular to the polymer film layer 12 comprising polyester and/or the film layer comprising polyester and/or nylon. It is noted that the metal oxide layer, and in particular the aluminum oxide layer, when combined with the polymer film layer 12, is configured to allow microwave heating of any wrapped food materials, and improves heat retention of the food article regardless of the method utilized to heat the wrapped food item. In the illustrated example, the barrier layer 14, and in particular when comprising aluminum oxide, may be provided as a coating on the second surface 24 of the polymer film layer 12. An example of a combined polymer film layer 12 and barrier layer 14 includes ECOSYAR:VE100 as available from Toyobo Co., Ltd. of Osaka, Japan. Preferably, the combined polymer film layer 12 and barrier layer 14 comprises a biaxially oriented polyester having a thickness of approximately 12 μm, a haze of approximately 2.6 percent, a machine direction tensile strength of about 220 MPa, a transverse direction tensile strength of about 230 MPa, a machine direction tensile elongation of about 100 percent, a transverse direction tensile elongation of about 95 percent, a water vapor transmission rate of about 2 g/m$^2$·day, and an oxygen transmission rate of about 20 ml/m$^2$·day·MPa. Preferably, the barrier layer 14 is applied to the polymer film layer 12 via a vacuum metalizing process.

The paper layer 18 comprises a food grade wrapping paper, and may include a waterproof or greaseproof food grade wrapping paper. In the illustrated example, the paper layer 18 has a grammage of within the range of from about 25 g/m$^2$ to 80 g/m$^2$, more preferably of within the range of from about 30 g/m$^2$ to 40 g/m$^2$, and most preferably of about 35 g/m$^2$, where grammage is the area density of the paper. The paper layer 18 is adhered to the polymer film layer 12 and the barrier layer 14 via the adhesive layer 16. In the illustrated example, the adhesive layer 16 is configured to adhere the paper layer to the polymer film layer 12 and the barrier layer 14 via a dry lamination process, such as EA-N6000-DM-KR as available from Toyochem Specialty Chemical SDN. BHD. of Seremban, Malaysia. Alternatively, the coating layer 20 may be adhered to the polymer film layer 12 and barrier layer 14 via other methods, including vibrational welding, heat welding, compression welding, wet lamination, and the like. As noted above, the paper layer 18 may be coated with the coating layer 20 subsequent to ink printing the label 19 on an outer, exposed surface of the paper layer 18, thereby allowing direct labelling of the overall food wrap 10 to identify the food either for storage or for display in point of sale purposes. Preferably, the coating layer 20 comprises, a varnish overlay configured to protect the ink label 19, such as CORK-OTE™-69KFP-1, as available from Cork Ind. of Folcroft, Pa.

In one embodiment, the paper layer 18 may be provided with an aperture 28 so as to allow at least a portion of the food article contained within the food wrap 10 to be viewed through the transparent or translucent polymer film layer 12. In certain configurations, the food wrap 10 may then be configured to allow viewing of the food item within the food wrap 10 while simultaneously completely wrapping the food item and providing a printable surface over certain portions of the paper layer 18.

The food wrap 10 may be manufactured via a method that includes providing the polymer film layer 12 or film layer (step 100), depositing the barrier layer 14 on the second surface 24 of the polymer film layer 12 via a vacuum metalizing process (step 102), applying the adhesive layer 16 to the combination of the polymer film layer 12 and the barrier layer 14 (step 104), and adhering the paper layer 18 or a combination of the paper layer 18, the ink label and the overlay 20 to the combination of the polymer film layer 12 of film layer and the barrier layer 14 via the adhesive layer 16 via a dry lamination process.

The present inventive food wrap and shown and described herein is configured to sufficiently wrap and store foods, such as sandwiches, in a point of sale presentation form while allowing for convection, conduction, radiant and microwave heating and providing improved heat retention and gas and moisture resistance, thereby resisting the propagation of liquids such as grease through the overall food wrap. The food wrap allows for direct convection, conduction, radiant and microwave heating of the wrapped foods while remaining within the food wrap, and simultaneously improve the ease of wrapping the food item and provides an aesthetically pleasing appearance where the food wrap provides the improvements noted above while displaying as "sandwich wrap" typically associated by customers with point of sale sandwich and other food displays.

In the foregoing description, it will be readily appreciated by those skilled in the art that modifications may be made to the embodiments disclosed herein without departing from the concepts of those embodiments. Such modifications are to be considered as included in the following claims, unless these claims by their language expressly state otherwise.

The invention claimed is:

1. A wrap configured to be heated, comprising:
   a polymer film layer comprising a biaxially oriented polyethylene terephthalate having a first surface, and a second surface opposite the first surface;
   a metal oxide layer comprising aluminum oxide covering at least a majority of one of the surfaces of the polymer film layer; and
   a paper layer coupled to one of the surfaces of the polymer film layer via an adhesive and having a grammage of about 35 g/m$^2$,
   wherein the polymer film layer is transparent,
   wherein the wrap is microwavable,
   wherein the metal oxide layer is located between the polymer film layer and the paper layer,
   wherein a total thickness of the polymer film layer and the metal oxide layer is about 12 μm,
   wherein the paper layer comprises an aperture configured to allow at least a portion of a food article contained within the wrap to be viewed through the polymer film layer, and
   further wherein the metal oxide layer is configured as a thermal and gas barrier.

2. The wrap of claim 1, wherein the adhesive comprises a dry lamination adhesive.

3. The wrap of claim 1, wherein an outer surface of the paper layer is coated with a coating layer.

4. The wrap of claim 3, wherein the coating layer comprises a food grade varnish.

5. The wrap of claim 3, wherein an ink label is printed on the outer surface of the paper layer such that the coating layer covers the ink label.

6. A food wrap for wrapping heated foods, comprising:
   a polyester film layer comprising a biaxially oriented polyethylene terephthalate having a first surface and a second surface opposite the first surface;
   a barrier layer comprising aluminum oxide covering at least a majority of the first surface of the polyester film layer;

a paper layer adhered to the first surface of the polyester film layer via an adhesive such that the barrier layer is positioned between the polyester film layer and the paper layer, where the paper layer has a grammage of about 35 g/m$^2$; and a coating layer covering at least a majority of an outer surface of the paper layer, wherein the coating layer comprises a food grade varnish, wherein the polyester film layer is transparent, wherein the food wrap is microwavable, wherein a total thickness of the polymer film layer and the barrier layer is about 12 μm, wherein the paper layer comprises an aperture configured to allow at least a portion of a food article contained within the food wrap to be viewed through the polyester film layer, and further wherein the barrier layer is configured as a thermal and gas barrier.

7. An ovenable food wrap for wrapping foods, comprising:
- a polymer film layer comprising a biaxially oriented polyethylene terephthalate having an inner surface and an outer surface;
- a metal oxide layer comprising aluminum oxide coating the outer surface of the polymer film layer; and
- a paper layer coupled to the outer surface of the polymer film layer such that the metal oxide layer is positioned between the polymer film layer and the paper layer, wherein the paper layer has a grammage of about 35 g/m$^2$, wherein the food wrap is microwavable, wherein the polymer film layer is transparent, wherein a total thickness of the polymer film layer and the metal oxide layer is about 12 μm, wherein the paper layer comprises an aperture configured to allow at least a portion of a food article contained within the ovenable food wrap to be viewed through the polymer film layer, and further wherein the metal oxide layer is configured as a thermal and gas barrier.

8. The ovenable food wrap of claim 7, wherein the paper layer is adhered to the metal oxide layer via an adhesive.

9. The ovenable food wrap of claim 7, wherein an outer surface of the paper layer is coated with a coating layer that comprises a food grade varnish.

10. A method for manufacturing a microwavable wrap for wrapping foods, comprising:
- providing a polymer film layer comprising a biaxially oriented polyethylene terephthalate having an inner surface, and an outer surface;
- covering at least a majority of the outer surface of the polymer film layer with a metal oxide layer comprising aluminum oxide;
- providing a paper layer having a grammage of about 35 g/m$^2$; and
- coupling the paper layer to the outer surface of the polymer film layer and to the metal oxide layer such that the metal oxide layer is located between the polymer film layer and the paper layer, wherein the wrap is microwavable, wherein the polymer film layer is transparent, wherein a total thickness of the polymer film layer and the metal oxide layer is about 12 μm, wherein the paper layer comprises an aperture configured to allow at least a portion of a food article contained within the microwavable wrap to be viewed through the polymer film layer, and further wherein the metal oxide layer is configured as a thermal and gas barrier.

11. The method of claim 10, further comprising:

printing an ink label on an outer surface of the paper layer; and coating the outer surface of the paper layer with a coating layer subsequent to printing the ink label.

* * * * *